United States Patent
Proctor et al.

(10) Patent No.: US 6,811,154 B2
(45) Date of Patent: Nov. 2, 2004

(54) NONCONTACTING FINGER SEAL

(75) Inventors: Margaret P. Proctor, Berea, OH (US); Bruce M. Steinetz, Westlake, OH (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 10/361,168

(22) Filed: Feb. 8, 2003

(65) Prior Publication Data

US 2004/0155410 A1 Aug. 12, 2004

(51) Int. Cl.[7] .............................................. F16J 15/44
(52) U.S. Cl. .......................... 277/355; 277/409; 277/416
(58) Field of Search ................................ 277/355, 409, 277/411, 412, 416, 417

(56) References Cited

U.S. PATENT DOCUMENTS

| | | | |
|---|---|---|---|
| 2,124,108 A | | 7/1938 | Grece |
| 3,576,328 A | | 4/1971 | Vose |
| 3,970,319 A | | 7/1976 | Carroll et al. |
| 4,645,217 A | | 2/1987 | Honeycutt, Jr. et al. |
| 4,678,113 A | | 7/1987 | Bridges et al. |
| 4,738,453 A | | 4/1988 | Ide |
| 4,756,536 A | | 7/1988 | Belcher |
| 5,031,922 A | * | 7/1991 | Heydrich ............... 277/355 |
| 5,042,823 A | | 8/1991 | Mackay et al. |
| 5,071,138 A | | 12/1991 | Mackay et al. |
| 5,100,158 A | | 3/1992 | Gardner |
| 5,108,116 A | | 4/1992 | Johnson et al. |
| 5,169,159 A | | 12/1992 | Pope et al. |
| 5,174,584 A | | 12/1992 | Lahrman |
| 5,246,295 A | | 9/1993 | Ide |
| 5,370,402 A | | 12/1994 | Gardner et al. |
| 5,385,409 A | | 1/1995 | Ide |
| 5,401,036 A | | 3/1995 | Basu |
| 5,474,305 A | | 12/1995 | Flower |
| 5,558,341 A | | 9/1996 | McNickle et al. |
| 5,632,493 A | | 5/1997 | Gardner |
| 5,755,445 A | * | 5/1998 | Arora ..................... 277/418 |
| 5,961,279 A | | 10/1999 | Ingistov |
| 5,971,400 A | | 10/1999 | Turnquist et al. |
| 6,196,550 B1 | | 3/2001 | Arora et al. |
| 6,364,316 B1 | * | 4/2002 | Arora ..................... 277/355 |

OTHER PUBLICATIONS

"Two–and Three Dimensional Numerical Experiments Representing Two Limiting Cases of an In–Line Pair of Finger Seal Components", pp. 1–8, Proctor et al., Feb. 10–14, 2002.

* cited by examiner

*Primary Examiner*—Alison Pickard
*Assistant Examiner*—Enoch Peavey
(74) *Attorney, Agent, or Firm*—Daniel D. Wasil; Ralph E. Jocke; Walker & Jocke

(57) ABSTRACT

An annular finger seal is adapted to be interposed between a high pressure upstream region and a lower pressure downstream region to provide noncontact sealing along a rotatable member. The finger seal comprises axially juxtaposed downstream and upstream finger elements, each having integrally spaced fingers. The downstream fingers each have a lift pad, whereas the upstream fingers lack a pad. Each pad extends in a downstream direction. Each upstream finger is spaced from the rotating member a greater distance than each pad. Upon sufficient rotational speed of the rotating member, each pad is operative to lift and ride on a thin film of fluid intermediate the rotating member and the pad.

26 Claims, 10 Drawing Sheets

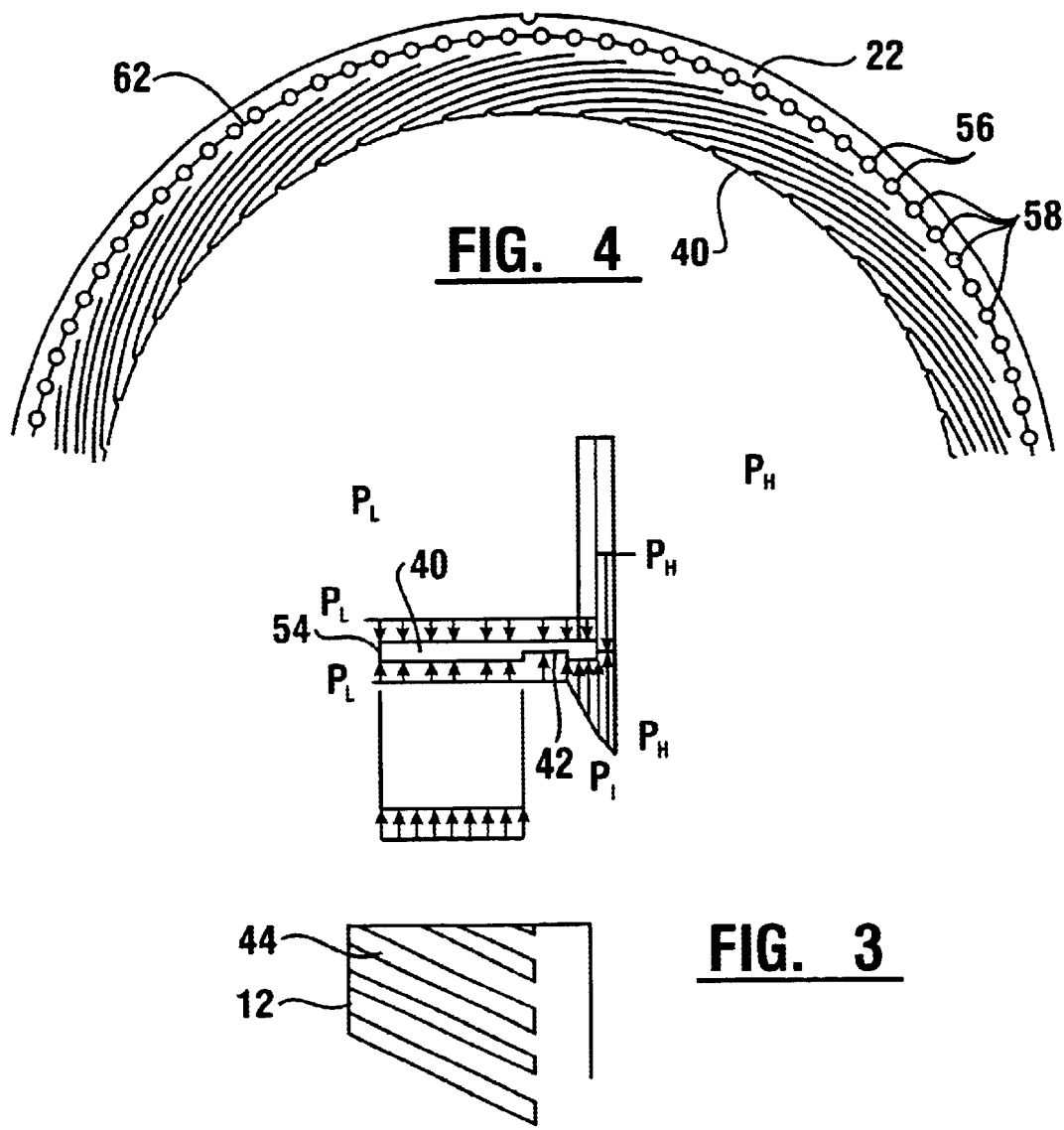

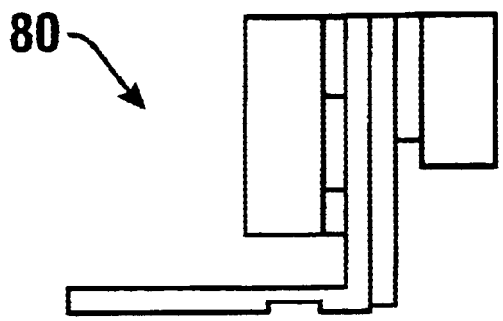
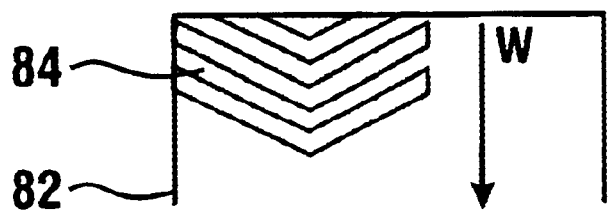
FIG. 8
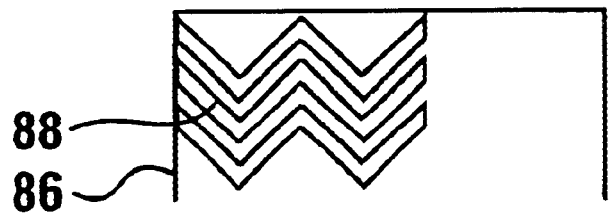
FIG. 9
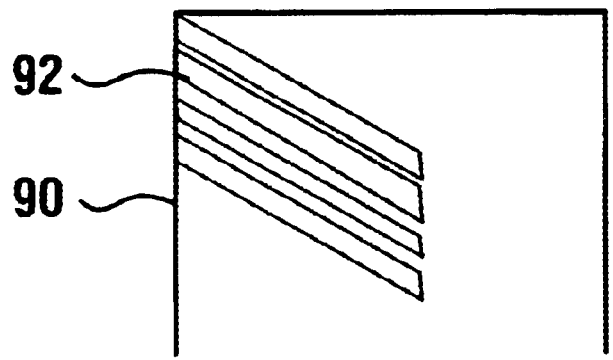
FIG. 10
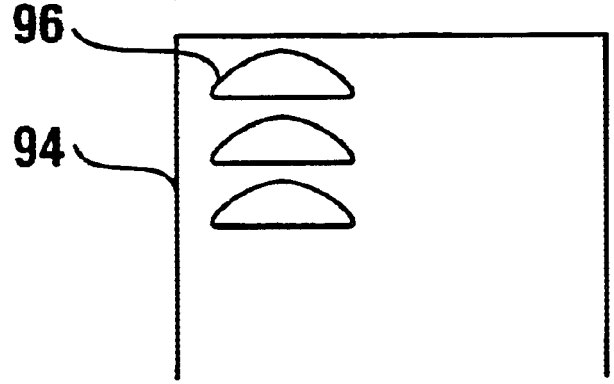
FIG. 11

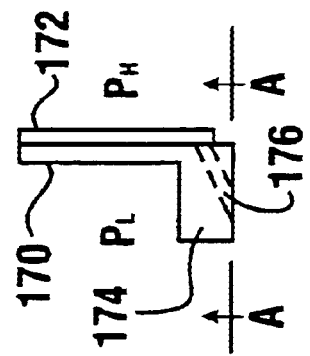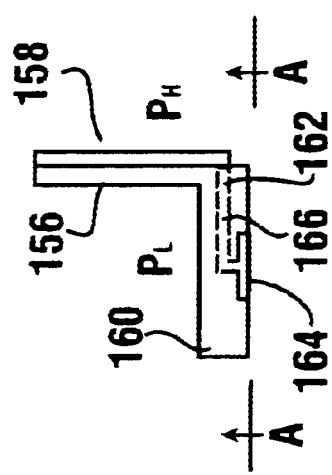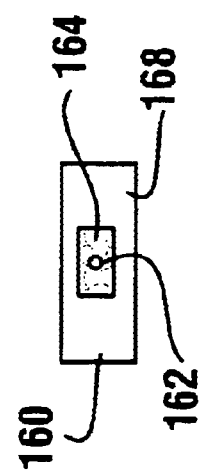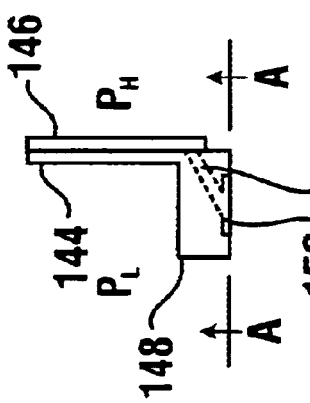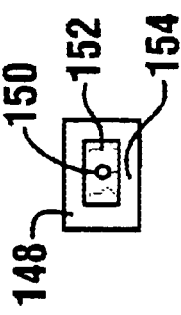

NONCONTACTING FINGER SEAL

ORIGIN OF THE INVENTION

The invention described herein was made by employees of the United States Government and may be manufactured and used by or for the Government of the United States of America for governmental purposes without the payment of any royalties thereon or therefor.

TECHNICAL FIELD

This invention relates in general to a sealing apparatus. More particularly, this invention relates to a finger seal apparatus which is adapted to be interposed between relatively high and low pressure cavities to provide sealing along a rotating member.

BACKGROUND OF THE INVENTION

Gas turbine engines can employ sealing devices in various capacities where it is necessary to restrict the flow of fluid or gases from one portion of the engine to another. A common use is for separating the primary engine flowpath from the secondary flowpath. The primary engine flowpath directs the flow of gases to the compressor and turbine stages, from which the engine derives thrust or power. The secondary flowpath comprises a series of conduits for delivering compressed air throughout the engine for performing a variety of functions. Compressed air can be used, for example, to cool individual components, provide a bleed air source, buffer the lubricated bearing cavities, control the ventilation among engine cavities and structures, and affect the thrust balance of the engine. Loss of compressed air from the secondary flowpath through leakage can have a substantial adverse effect on the performance of these functions. In a turbine engine at least one sealing device is typically required for each turbine and compressor stage of the engine.

Another common use for sealing devices in turbine engines is for separating the secondary flowpath from engine cavities containing fluids such as lubricating oil. In pressurized aircraft, bleed air taken from the secondary flowpath supplies the aircraft environmental control system. Even small amounts of oil in the bleed air can render it unsuitable for this purpose. Further, oil leakage can lead to coking of the seal, and ultimately reduced seal life. To prevent this, buffered sealing devices typically are incorporated adjacent lubricated bearings and engine oil sumps.

Labyrinth seals are noncontacting seals and are commonly used in gas turbine engines to seal leakage flows along a shaft. In labyrinth seals the clearance is fixed and must be large enough to accommodate centrifugal and thermal growth of the shaft, thermal changes in the surrounding structure, and dynamic motion of the shaft to avoid contact between the seal and the rotor. Radial excursions can be substantial, particularly in propulsion gas turbine engines used in aircraft. Brush seals and finger seals are two types of compliant contacting seals that can reduce seal leakage over typical labyrinth seals.

Brush seals are typically comprised of a ring-shaped pack of small diameter wire bristles set at an angle to the radial direction and sandwiched between a front and back washer. Because the bristles are set at an angle, they can act like cantilevered beams and bend out of the way during shaft perturbations.

Finger seals are typically comprised of a plurality of flexible fingers fixed at one end, and the opposite ends sealingly engaging a surface that is rotatable relative thereto. The fingers of a finger seal can be an integral part of the seal, usually formed by machining a series of curved slots in a forged ring or a length of sheet stock. The slots can be of consistent length and extend from a common edge of the material. A complete finger seal can be made up of two or more layers of fingers relatively positioned adjacent each other.

A problem with finger seals is that at high shaft speeds, the rubbing contact between the fingers and the rotating surface can cause excessive heating of the components, which in turn lowers the durability and ultimately limits the life of the seal. The problem is further aggravated when the seal is used in high temperature applications. Accordingly, the desired sealing is undermined leading to engine inefficiencies. As a result, various techniques have been employed to increase the speeds and temperatures at which finger seals may be effectively used. A technique commonly employed for increasing durability is to provide a hardened and very smooth coating on the contacting surface of the rotating component.

DISCLOSURE OF INVENTION

Thus, there exists a need for a finger seal capable of extended use in high speed and temperature environments, such as those involving gas turbine engines.

It is an object of an exemplary form of the present invention to provide a finger seal apparatus capable of extended use in high speed and high temperature environments.

It is a further object of an exemplary form of the present invention to provide a finger seal capable of extended use in gas turbine engines.

It is a further object of an exemplary form of the present invention to provide a finger seal that can be interposed between relatively high and low pressure cavities.

It is a further object of an exemplary form of the present invention to provide a finger seal that can be interposed between relatively high and low pressure cavities to provide sealing along a rotating member.

It is a further object of an exemplary form of the present invention to provide a finger seal that can provide sealing between a rotatable member and a housing circumscribing the rotatable member.

It is a further object of an exemplary form of the present invention to provide a finger seal that can provide sealing between a rotatable turbine shaft and a housing circumscribing the rotatable turbine shaft.

It is a further object of an exemplary form of the present invention to provide a finger seal that can be interposed between an upstream region of relatively high fluid pressure and a downstream region of relatively lower fluid pressure to inhibit fluid flow therebetween.

It is a further object of an exemplary form of the present invention to provide an annular sealing apparatus capable of being placed for disposition between a body defining a bore and a rotating member, such as a seal rotor mounted on a rotating shaft or the shaft itself, rotatably received in the bore to inhibit fluid leakage therebetween.

It is a further object of an exemplary form of the present invention to provide an improved noncontacting finger seal that includes lift pads attached to downstream fingers, upstream fingers that do not contact the rotor, and pressure balance features.

Further objects of exemplary forms of the present invention will be made apparent in the following Best Mode for Carrying Out Invention and the appended claims.

The foregoing objects are accomplished in exemplary forms of the present invention by a finger seal apparatus. The apparatus can comprise axially juxtaposed first and second comb-like members or finger elements. Each finger element can have a plurality of uniformly spaced and integral fingers. The fingers can circumscribe a rotating member. Each finger can have substantially the same width and the same spiral curvature, and be separated from an adjacent finger by a uniform gap. First and second finger elements can be adjacently positioned so that the fingers of each block the gaps in the other.

At the innermost end of each finger of the first finger element is a lift pad operative to provide sealing to the rotating member in a noncontacting manner. Each lift pad can be substantially larger than its respective finger and shaped to enhance hydrodynamic lifting so as to enable at least a portion of the lift pad to lift away from the rotating member and run on a thin film of fluid upon sufficient rotational speed of the rotating member.

In an exemplary form of the invention an annular finger seal apparatus can be interposed between an upstream region of relatively high fluid pressure and a downstream region of relatively lower fluid pressure to provide noncontact sealing along a rotatable member. In the exemplary form only the fingers of the first finger element have a lift pad. The first finger element is positioned downstream of the second finger element. Each lift pad extends from its respective finger in a downstream direction. The innermost diameter of the fingers of the second (or upstream) finger element is larger than the innermost diameter of the lift pads. The innermost diameter of the fingers of the second finger element is also smaller than the outermost diameter of the lift pads. In positioning of the finger seal apparatus, each lift pad can be arranged adjacent to the rotating member while each finger of the second finger element is spaced from the rotatable member. At least a portion of each lift pad is operative to lift away from the rotating member upon at least one of sufficient rotational speed of the rotating member or hydrostatic pressure loading adjacent the lift pad. In an exemplary form of the invention, upon sufficient rotational speed of the rotating member, each lift pad can ride on a thin film of fluid intermediate the rotating member and the lift pad.

BRIEF DESCRIPTION OF DRAWINGS

FIG. 3 shows hydrostatic and hydrodynamic pressure forces acting on a finger seal.

FIG. 4 shows an upstream sectional view of a finger element.

FIG. 8 shows a rotor with a herringbone groove pattern.

FIG. 9 shows a rotor with a double herringbone groove pattern.

FIG. 10 shows a rotor with a pattern of various combinations of groove widths and lengths.

FIG. 11 shows a rotor with a buckets groove pattern.

FIG. 25 shows a finger element portion with an orifice-compensated hydrostatic lift pad having an angled orifice and a lift pad pocket.

FIG. 26 shows a view of the lift pad taken along A-A of FIG. 25.

FIG. 27 shows a finger element portion with an orifice-compensated hydrostatic lift pad having an orifice with a substantially straight portion, and a lift pad pocket.

FIG. 28 shows a view of the lift pad taken along A-A of FIG. 27.

FIG. 29 shows a finger element portion with an orifice-compensated hydrostatic lift pad without a pocket.

FIG. 30 shows a view of the lift pad taken along A-A of FIG. 29.

BEST MODE FOR CARRYING OUT INVENTION

Figure 1:
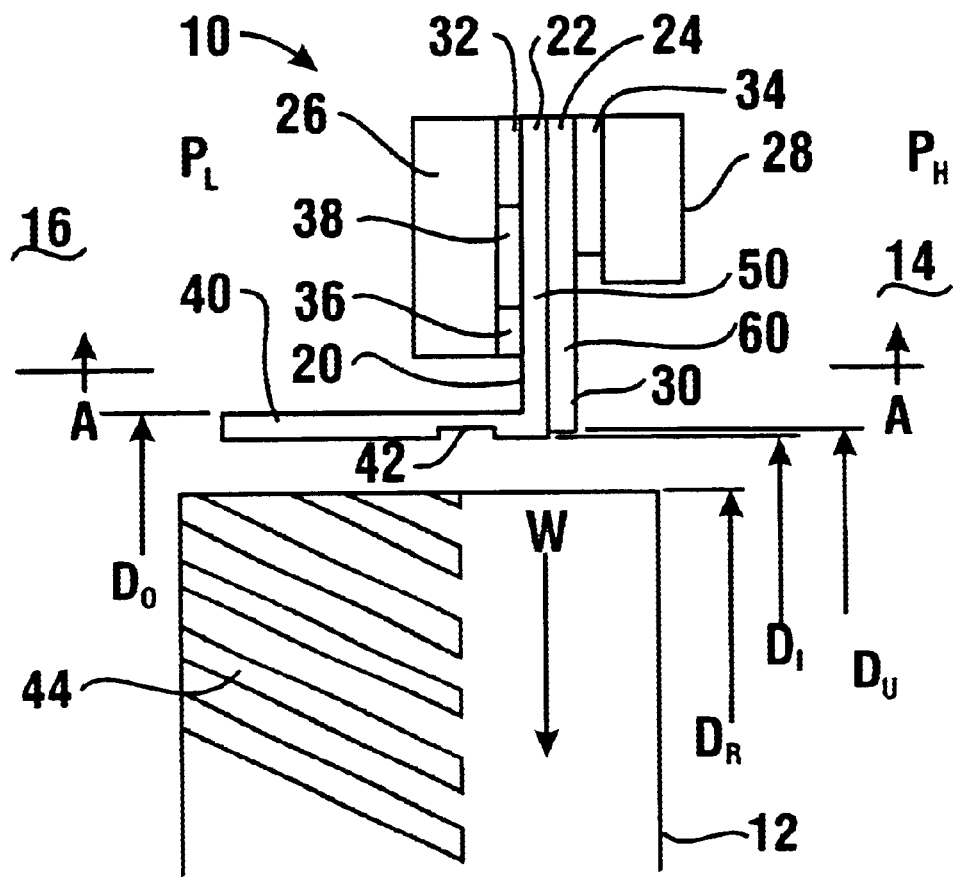
FIG. 1 shows an apparatus including a finger seal and an adjacent rotatable member.

Referring now to the drawings and particularly to FIG. 1, there is shown therein a sectional view of an embodiment of a finger seal apparatus of the present invention. FIG. 1 shows a noncontacting finger seal apparatus (which hereinafter may alternatively be referred to as "seal" or "finger seal" or "seal apparatus") 10 adjacent a rotatable member 12 and intermediate an upstream zone or region 14 of relatively high fluid pressure ($P_H$) and a downstream zone or region 16 of relatively lower fluid pressure ($P_l$). The finger seal apparatus 10 can include axially juxtaposed annular comb-like members or finger elements 22, 24. Each finger element can have a plurality of uniformly spaced and integral comb-like teeth or fingers. A finger element may comprise a whole ring with a plurality of fingers. Further example and discussion of various components of a finger seal may be found in U.S. Pat. Nos. 5,755,445 and 6,196,550, the disclosures of which are incorporated herein by reference.

FIG. 1 shows a downstream finger 20 of the downstream finger element 22 and an upstream finger 30 of the upstream finger element 24. Also shown are an aft cover plate 26, a forward cover plate 28, and aft spacer 32, a forward spacer 34, a sealing dam 36, a pressure balance cavity 38, and a lift pad 40. The lift pad may have a circumferential slot or groove 42. The rotatable member 12 may have grooves 44. The arrow W represents the rotation of a rotatable member about an axis. $D_R$ is the diameter of the rotatable member 12. $D_I$ is the inner diameter of the seal 10 (and the lift pad 40). $D_U$ is the inner diameter of the upstream finger 30. $D_O$ is the outer diameter of the lift pad 40. As shown, an exemplary relationship among the diameters can be $D_R < D_I < D_U < D_O$.

Figure 2:
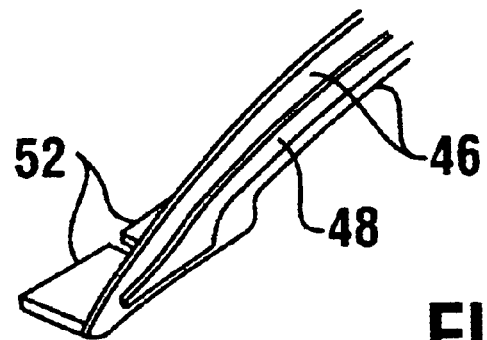
FIG. 2 shows arranged fingers portions.

A finger can have a stick portion ("stick") and a finger pad portion ("finger pad"). The finger pad and stick may be integral or one-piece. The finger pad can be a wider part of the finger which is adjacent to the inner diameter of the finger. The finger of a finger element can be an integral part of the finger element, and may be formed by cutting or machining a series of curved slots in a forged ring or a length of sheet stock. Each finger of a finger element may have substantially the same width and the same spiral curvature, such as a logarithmic spiral curvature. Each finger of a finger element may also be separated from an adjacent finger by a uniform gap (or space or slot or inter finger gap). First and second finger elements can be positioned relative to each other so that the fingers of each finger element block the inter finger gaps in the other finger element. FIG. 2 shows portions of fingers 46, 48 indexed so that the gap or space between the fingers of one finger element are covered by the fingers of the adjacent finger element. Each of the downstream fingers 46 are shown with a lift pad 52, whereas the upstream finger 48 is shown without a lift pad.

A finger element can have lift pads at an innermost end thereof to provide sealing (e.g., primary sealing) to a rotating member or rotor in a noncontacting manner. That is, sealing without direct contact. Returning to FIG. 1, the downstream finger 20 has a stick portion 50. The upstream finger 30 also has a stick portion 60. As previously discussed, a finger may have a finger pad at an end thereof. For a finger with a lift pad, the finger pad can be located intermediate the stick portion and the lift pad. In an exemplary form of the invention a lift pad 40 can be attached to a finger, extending from the finger at an end thereof. For example, a lift pad may be brazed to a finger. Of course, other arrangements involving a one-piece or integral finger and lift pad may also be used. A lift pad can have a curvature concentric to the rotatable member curvature. Thus, the fingers can circumscribe a rotating member.

A seal can be arranged relative to a resting rotatable member so that there is a (noncontacting) initial clearance between the lift pads and the rotatable member or there may be some initial interference to obtain the desired clearance at operating conditions. For example, during a sealing assembly a seal may be arranged adjacent to a rotor with a small initial clearance therebetween so that as the rotor grows (e.g., due to thermal and/or centrifugal growth) the rotor may come close to the seal at which time the seal can begin to "fly" or lift away from the rotor, as discussed in more detail hereinafter.

Each lift pad can be substantially larger than its respective finger and shaped to enhance hydrodynamic lifting so as to enable at least a portion of the lift pad to lift away from the rotating member and run on a thin film of fluid upon sufficient rotational speed of the rotatable member. There can be a (noncontacting) clearance between a lift pad and a rotating rotatable member during a sealing operation. Thus, a finger seal apparatus of the present invention can provide noncontacting sealing to a rotatable member. As discussed in more detail hereinafter, a lift pad may have a circumferential slot or groove 42 adjacent its inner diameter $D_I$ to provide uniform pressure boundary conditions and balance hydrostatic loads. Because a lift pad can create a self-acting lifting surface, a small initial (resting) sealing clearance or interference (e.g., contact) between the seal and the rotatable member can be used.

In an exemplary form of the invention only the fingers 20 of the downstream finger element 22 have a lift pad. Furthermore, each lift pad 40 extends from its respective finger 20 in a downstream direction. The absence of lift pads on fingers 30 (lift pad-less fingers) on the upstream high pressure side can provide a seal in which less axial space is required. Thus, an exemplary seal of the present invention is capable of use in limited-space sealing environments. Furthermore, the absence of upstream lift pads removes the hydrostatic closing forces that could cause the upstream lift pads to contact the rotating member, thereby eliminating a source of seal wear and extending seal life.

The inner diameter of the upstream (or lift pad-less) fingers 30 can be larger than the diameter of the rotatable member 12 (e.g., rotor or shaft or blade) to prevent finger-to-rotor contact during operation. With a pressure drop across the seal, the upstream fingers 30 will have a small net closing force acting radially upon them that would tend to close the gap between the seal and the rotor. Finger (upstream and downstream) stiffness opposes this closing force. Based on the particular sealing application, the finger stiffness and rotor gap parameters can be predetermined to yield the lowest possible leakage without seal-to-rotor contact.

In an exemplary form of the invention, as shown in FIG. 1, the upstream finger innermost diameter $D_U$ can be larger than the downstream lift pad innermost diameter $D_I$. This rotor-spaced arrangement of the upstream finger 30 can virtually eliminate seal-to-rotor contact (during rotor operation) and thus seal wear. Also shown in FIG. 1, the upstream finger innermost diameter $D_U$ can be smaller than the downstream lift pad outermost diameter $D_O$. This arrangement of the upstream fingers 30 can achieve blocking of most of the leakage flow through the gaps between the downstream fingers 20. Therefore, having each upstream finger element without a lift pad, but with its innermost diameter intermediate the innermost and outermost diameters of a downstream lift pad, can assist in achieving low flow leakage without excessive wear.

In positioning of the finger seal apparatus 10 adjacent to a rotatable member 12, each lift pad 40 can be more closely arranged adjacent to the rotatable member than each upstream finger element 24. Each lift pad 40 can lift away from the rotating member 12 due to sufficient rotational speed of the rotating member and/or due to pressure loading adjacent the lift pad. That is, at least a portion of each lift pad is operative to lift away from the rotating member upon at least one of hydrodynamic force caused by sufficient rotational speed of the rotating member or hydrostatic force caused by hydrostatic pressure loading adjacent the lift pad. For example, in a particular application, upon sufficient rotational speed of a rotating member, a lift pad can ride (or float) on a thin film of fluid intermediate the rotating member and the lift pad.

Because the upstream fingers 30 do not fully extend to contact the rotatable member, there can be small "pinhole" openings or gaps between adjacent downstream fingers 20 through which small amounts of air can flow or leak. A pinhole opening can be a part of a gap between adjacent downstream fingers 20 which is not blocked by an upstream finger 30. The closer the inner diameter $D_U$ of the upstream finger 30 is sized to the rotatable member diameter $D_R$, the smaller the pinhole leakage.

In applications where significant shaft transients are expected and long seal life is desired, a seal can be used which has relatively slightly larger pinholes. For example, an application may have a finger seal apparatus with fifty-two pinhole locations, a pinhole gap width of 0.031 inch, a discharge coefficient for the pinholes set to 1.0, a supply pressure of 30 psid, and a supply temperature of 70° F. In such conditions, with a pinhole gap height of 0.010 inch, the leakage flow through the pinhole locations would be approximately 0.0167 lbm/s. In applications where small shaft transients are expected and low leakage is required, a seal can be used which has relatively smaller pinholes. For example, using substantially the same above conditions, but with a pinhole gap height changed to 0.005 inch, the leakage flow through the pinhole locations would be approximately 0.0083 lbm/s.

Using a discharge coefficient set to 0.6, which may be more typical for an orifice, the leakage through the pinhole locations in the above examples would be approximately 0.0100 lbm/s and 0.0050 lbm/s, respectively. Of course, pinhole leakage can be reduced by decreasing the pinhole gap height and width as the application allows.

Pinhole leakage can add to the basic overall seal leakage. However, even though the overall seal leakage may be higher, the seal can achieve less wear and thus have an extended life. Furthermore, minimizing or eliminating the issue of seal wear provides the benefit of generally having a known and constant leakage rate.

FIG. 1 shows a configuration with a single upstream finger element 24. However, it should be understood that, depending on the application, either single or multiple upstream finger elements may be employed in a sealing apparatus of the present invention.

In an exemplary form of the invention, the finger seal apparatus provides for a sealing mechanism composed of only two rows of finger elements, such as shown in FIG. 1. The low pressure row has lift pads and the high pressure row is lift pad-less. The rows are mounted adjacent each other in a staggered arrangement or relationship. The high pressure row serves to seal the interstices between the fingers of the low pressure row. It should be understood that additional rows of finger elements may be used in a sealing apparatus of the present invention.

FIG. 3 shows hydrostatic and hydrodynamic pressure forces that can act on a finger seal, such as the finger seal 10, to generate lifting force. A rotatable member 12 is also shown for purposes of alignment comparison. The arrows adjacent the lift pad 40 show the hydrostatic pressures. The separate lower set of arrows show the hydrodynamic pressure. Hydrostatic pressure alone can generate a positive net lifting force on a downstream lift pad 40. The low-pressure forces acting on the top and bottom of the lift pad between the circumferential groove 42 and the downstream edge 54 balance out. The force generated by the pressure gradient from the high pressure ($P_H$) to the intermediate pressure ($P_I$) to the low pressure ($P_L$) acting on the lift pads exceeds the force of the low pressure ($P_L$) acting on the downstream finger. For applications requiring it, a hydrodynamic lifting force can be created by having grooves 44 in the rotating member 12. A hydrodynamic lifting force can increase with rotational speed. A groove pattern can be arranged on a rotating member to communicate fluid from the circumferential groove 42 on the lift pad to the downstream side of the lift pads. Grooves of a rotating member may be oriented to pump against or with the leakage flow. In an exemplary arrangement, grooves are only located on the circumferential surface area of a rotating member which is adjacent to the lift pads of a sealing apparatus.

FIG. 4 shows an upstream sectional view of a finger element, such as the downstream finger element 22 of FIG. 1. A downstream finger element and an adjacent upstream finger element can both include indexing and rivet holes 56 and pressure-feed holes 58. The pressure-feed holes can be used in communicating upstream pressure to a pressure balance cavity 38. The cavity can be created by an aft spacer 32, a downstream stick 50, an aft cover plate 26, and a seal dam 36. The indexing and rivet holes 56 can be on the same fastening (e.g., bolt) circle 62 as the pressure-feed holes 58. The pressure-feed holes can be arranged so that as adjacent upstream and downstream finger elements 24, 22 are indexed to each other their pressure-feed holes align with each other.

Figure 5:
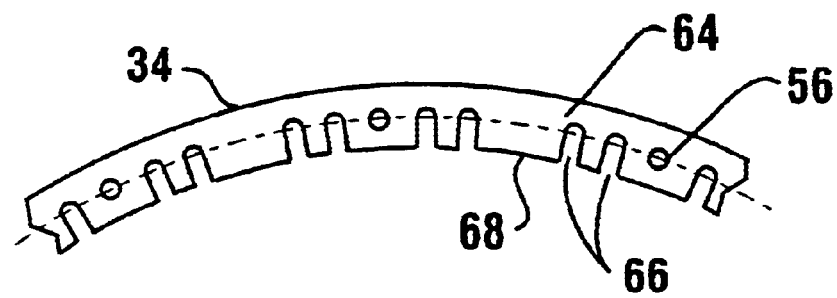
FIG. 5 shows a sectional view of an upstream spacer.

FIG. 5 shows an upstream spacer, such as the upstream spacer 34 of FIG. 1. The upstream spacer 34 includes a ring 64 which has a series of slots 66 cut through and around its inner diameter 68. These slots 66 can align with the pressure-feed holes 58 in the upstream and downstream finger elements 24, 22 so that the high pressure at the inner diameter of the upstream spacer 34 can be communicated to the pressure-feed holes.

Figure 6:
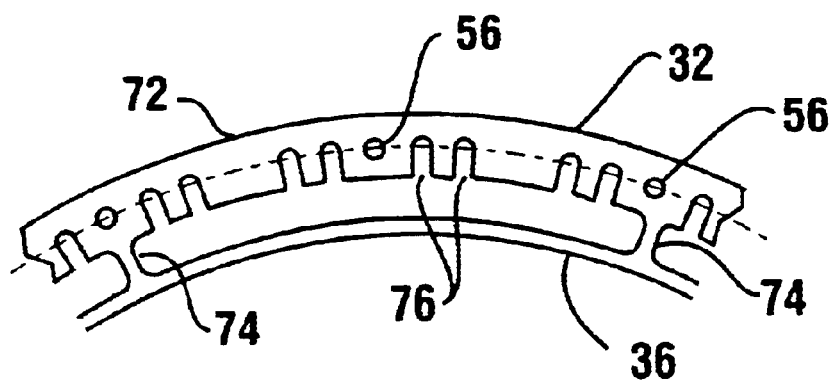
FIG. 6 shows a sectional view of a downstream spacer.

FIG. 6 shows a downstream spacer, such as the downstream spacer 32 of FIG. 1. The downstream spacer 32, like the upstream spacer 34, includes a ring 72 which also has a series of slots 76 that align with the pressure-feed holes 58 in the finger elements. The slots 76 can convey high pressure to a volume in the pressure balance cavity 38. The seal dam 36 can be a smaller diameter second ring of the downstream spacer 32. The seal dam can be attached to the outer ring 72 by thin spokes 74. A minimal number of spokes 74 can be used to minimize the area of the downstream spacer 32 that contacts the downstream fingers 20 in order to minimize frictional forces that can cause hysteresis.

Figure 7:
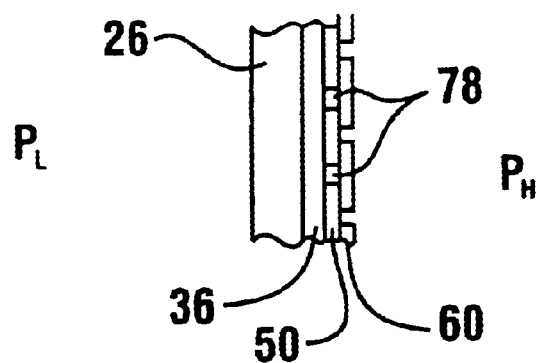
FIG. 7 shows a view taken along line A-A of FIG. 1.

FIG. 7 shows an enlarged fragmentary cross-sectional view taken along line A-A of FIG. 1. The view, looking radially away from the rotor, is at the seal dam inner diameter. The view cuts through the aft cover plate 26, seal dam 36, downstream stick 50, and upstream stick 60. As previously discussed, adjacent downstream fingers can be separated by a gap or slot. FIG. 7 shows a gap 78 between adjacent downstream fingers 20. The total cross-sectional area of the pressure-feed holes 58 should be at least three times greater than the total cross-sectional flow area of the gaps 78 to ensure that the pressure in the pressure balance cavity 38 is nearly equal to the upstream pressure ($P_H$).

In FIG. 3 the lift pad 40 has a circumferential slot or pocket or groove 42 on the seal inner diameter $D_I$ to give uniform boundary conditions for the portion of the lift pad located between the circumferential groove and the downstream edge 54. If the lift pad inner diameter $D_I$ has a curvature that is concentric to the rotatable member, then a hydrodynamic arrangement on the rotatable member and/or the lift pad may be used to generate lift. For a concentric lift pad having a circumferential groove (or slot or pocket), geometric (groove) patterns on a rotatable member can be used to generate sufficient hydrodynamic lift during rotation.

FIGS. 8–11 show various hydrodynamic lift features (e.g., geometric groove patterns) on a rotatable member. FIG. 8 shows a rotatable member 82 (e.g., a rotor) having a herringbone groove pattern 84. The rotatable member 82 is shown in an operating alignment with an adjacent seal portion 80. FIG. 9 shows a rotatable member 86 having a double herringbone groove pattern 88. FIG. 10 shows a rotatable member 90 having a pattern 92 of various combinations of groove widths and lengths. FIG. 11 shows a rotatable member 94 having a buckets groove pattern 96.

FIGS. 12–32 show examples of finger element portions having lift pads which can generate hydrostatic lift and/or hydrodynamic lift. Of course, it should be understood that the lift pad configurations, geometries, and dimensions discussed herein are merely exemplary and that other configurations, geometries, and dimensions may be used without departing from the scope of the invention. Additionally, in exemplary forms of the invention, the lift pad configurations shown in FIGS. 12–32 may be used with a rotatable member having a smooth outer surface. Furthermore, as shown in certain examples, the stick portion of a finger can have inner and outer radii which are drawn with a logarithmic curve. The radii can be arcs of circles having the same radius but being offset from the geometric center.

Figure 12:
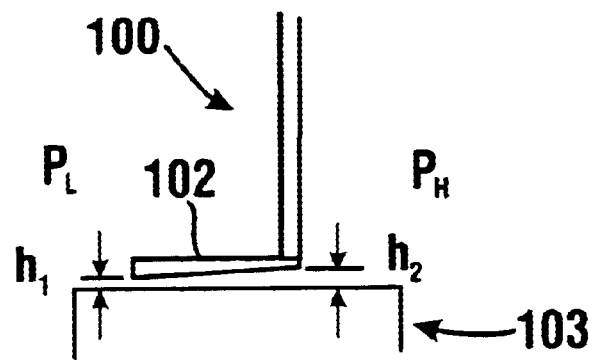
FIG. 12 shows a finger element portion having a converging flow axial tapered lift pad.

FIG. 12 shows a finger element portion 100 having a converging flow axial tapered lift pad 102 adjacent a rotatable member (e.g., rotor) 103. That is, a lift pad can be tapered (e.g., becoming thinner or smaller) in a direction such as the direction substantially parallel to the axis of the rotor (or the axial direction of the rotor). A converging flow axial taper creates a converging flow path arrangement that generates hydrostatic pressure under the lift pad and causes lift. The taper causes height $h_1$ to be less than height $h_2$.

Figure 13:
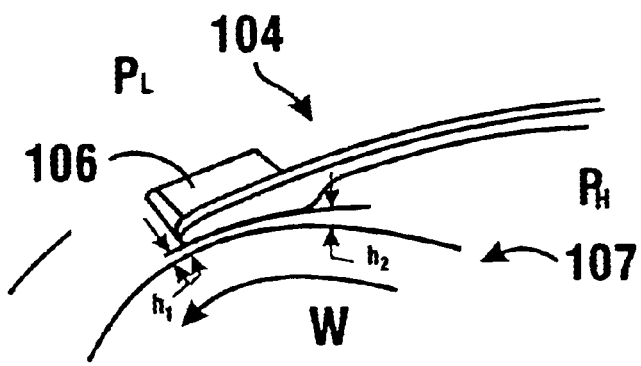
FIG. 13 shows a finger element portion having a converging flow circumferentially tapered lift pad.

FIG. 13 shows a finger element portion 104 having a converging flow circumferentially tapered lift pad 106 adjacent a rotor 107. An arrow W is representative of the direction of rotor rotation. The circumferential taper creates a converging flow path during rotation as fluid is dragged with the rotating member through the narrowing gap. Again, height $h_1$ is less than height $h_2$.

Figure 14:
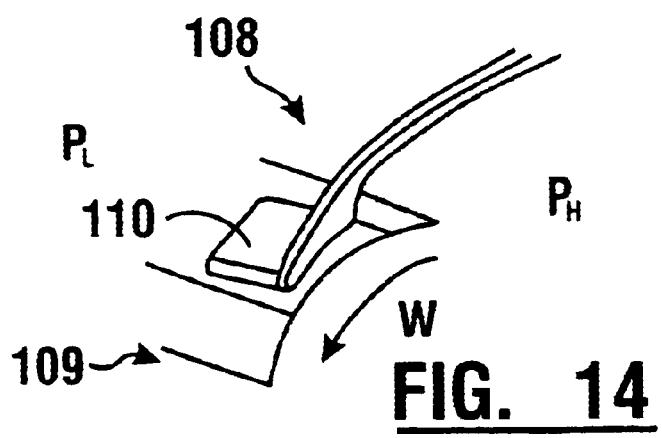
FIG. 14 shows a finger element portion having a combination of an axial and circumferentially tapered lift pad.

FIG. 14 shows a finger element portion 108 having a combination of an axially and circumferentially tapered lift pad 110 adjacent a rotor 109. Thus, FIG. 14 includes features of FIG. 12 and FIG. 13.

Figure 15:
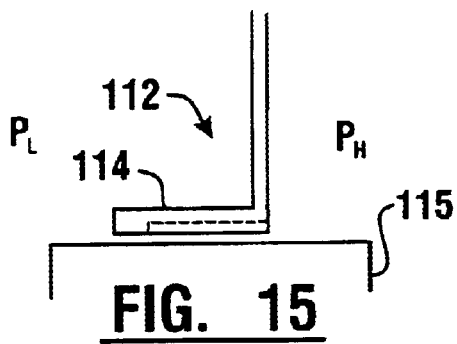
FIG. 15 shows a finger element portion having an axial Rayleigh-step lift pad.
Figure 16:
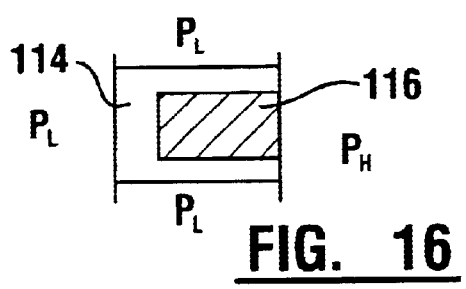
FIG. 16 shows the lift pad of FIG. 15 taken along its inner diameter geometry.
Figure 17:
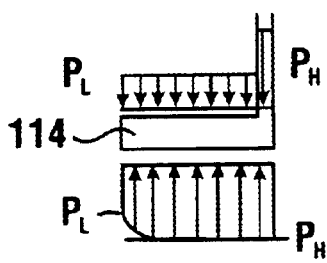
FIG. 17 shows the pressure loads on the lift pad of FIG. 15.
Figure 20:
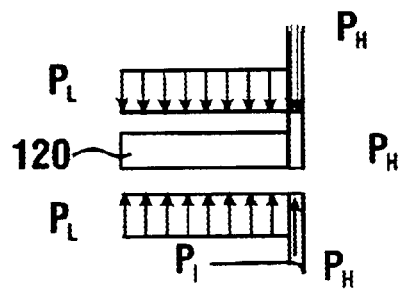
FIG. 20 shows the pressure loads on the outer diameter of the lift pad of FIG. 18 and on the inner diameter near the leading edge of the lift pad.

FIG. 15 shows a finger element portion 112 having an axial Rayleigh-step lift pad 114 adjacent a rotor 115. FIG. 16 shows the lift pad 114 along its inner diameter geometry. The lift pad 114 has a pocket 116 adjacent its inner diameter, as shown in FIG. 16. The pocket is open to and can be filled with fluid from the upstream high pressure $P_H$. The pressure loads at the middle of the lift pad are shown in FIG. 17. This can result in a net force acting to cause the lift pad to lift radially outward.

Figure 18:
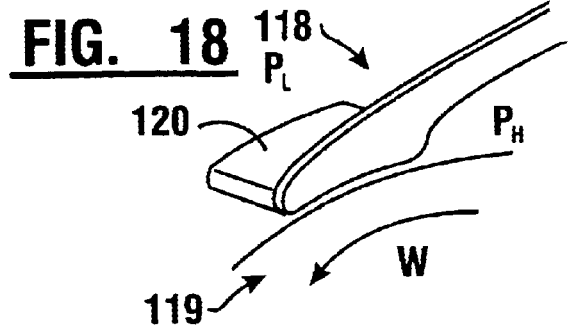
FIG. 18 shows a finger element portion having a circumferential Rayleigh-step lift pad.
Figure 19:
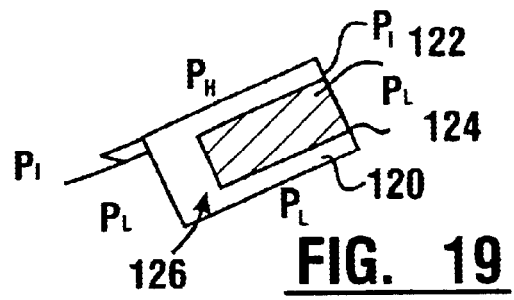
FIG. 19 shows the lift pad of FIG. 18 taken along its inner diameter geometry.
Figure 21:
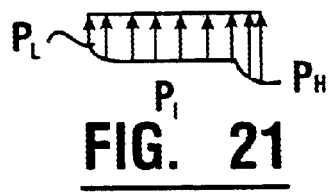
FIG. 21 shows the pressure loads across the pocket seal dam of FIG. 19.

FIG. 18 shows a finger element portion 118 having a circumferential Rayleigh-step lift pad 120 adjacent a rotor 119. FIG. 19 shows the lift pad 120 along its inner diameter geometry, looking upward from the bottom of the lift pad. The lift pad has a pocket 122 adjacent its inner diameter, as shown in FIG. 19. A lift pad leading edge 124 and seal dam 126 are also shown. During rotation, fluid is drawn through the pocket and into a sudden constriction created by the pocket seal dam 126. This creates a pressure rise which can result in a hydrodynamic lift force on the pad. The pressure loads acting on the lift pad outer diameter are constant over the circumferential length of the pad. The pressure loads shown in FIG. 20 on the lift pad inner diameter are near the leading edge. The pressure load on the lift pad inner diameter varies over the circumferential length of the pad. FIG. 21 shows the pressure loads across the pocket seal dam 126. The pressure is intermediate $P_H$ and $P_L$ at the seal dam.

Figure 22:
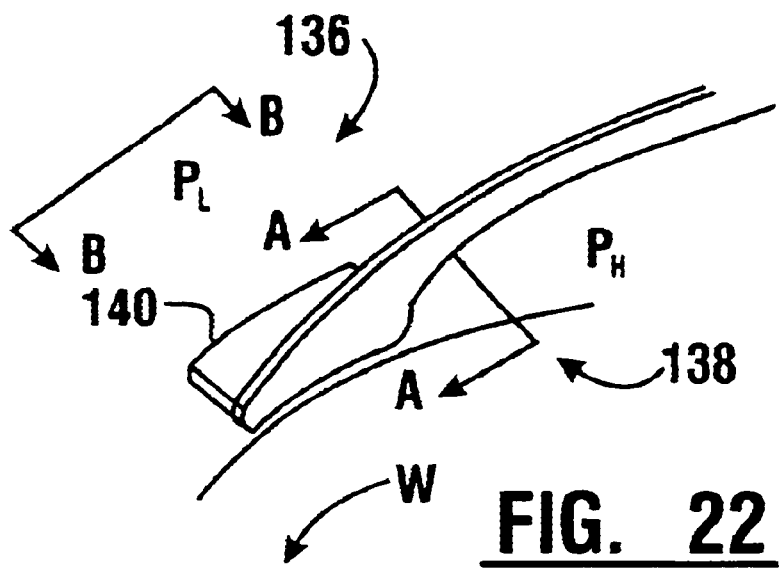
FIG. 22 shows a finger element portion having a lift pad with a circumferential step.
Figure 23:
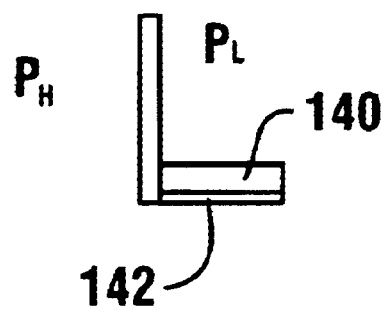
FIG. 23 shows a view of the finger element portion taken along A-A of FIG. 22.
Figure 24:
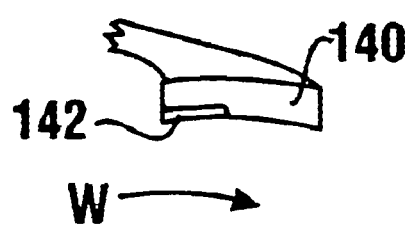
FIG. 24 shows a view of the finger element portion taken along B-B of FIG. 22.

FIG. 22 shows a finger element portion 136 having a lift pad 140 adjacent a rotor 138. The lift pad 140 has a circumferential step 142. The circumferential step can generate hydrodynamic lift. FIG. 23 shows a view of the finger element portion with the lift pad taken along A-A of FIG. 22. FIG. 24 shows a view of the finger element portion taken along B-B of FIG. 22 to view the lift pad from its downstream side.

FIGS. 25–30 each show an orifice-compensated lift pad arrangement. High pressure can be supplied to a pocket adjacent a lift pad inner diameter through an orifice. The orifice can extend through a portion of the lift pad. The supplied high pressure can be used to restrict flow and provide lifting force to the lift pad. A supply hole to an orifice can be located at the gap or space between adjacent upstream fingers.

FIG. 25 shows a downstream finger 144 and an upstream finger 146. The downstream finger 144 has an orifice-compensated hydrostatic lift pad 148. The lift pad has an orifice 150 angled to a lift pad pocket 152. FIG. 26, taken along A-A of FIG. 25, shows a view of the lift pad 148 taken along the lift pad inner diameter. FIG. 26 shows lift pad 148, orifice 150, pocket 152, and a seal dam 154.

FIG. 27 shows a downstream finger 156 and an upstream finger 158. The downstream finger 156 has an orifice-compensated hydrostatic lift pad 160. The lift pad has an orifice 162 to a pocket 164. The orifice includes a substantially straight portion 166. FIG. 28, taken along A-A of FIG. 27, shows a view of the lift pad 160 taken along the lift pad inner diameter. FIG. 28 shows lift pad 160, orifice 162, pocket 164, and a seal dam 168.

FIG. 29 shows a downstream finger 170 and an upstream finger 172. The downstream finger 170 has an orifice-compensated hydrostatic lift pad 174 without a pocket. The lift pad has an orifice 176. An orifice may be angled in a direction away from an upstream finger and toward the inner diameter of a lift pad (e.g., toward a rotor). FIG. 30, taken along A-A of FIG. 29, shows a view of the lift pad 174 taken along the lift pad inner diameter.

Figure 31:
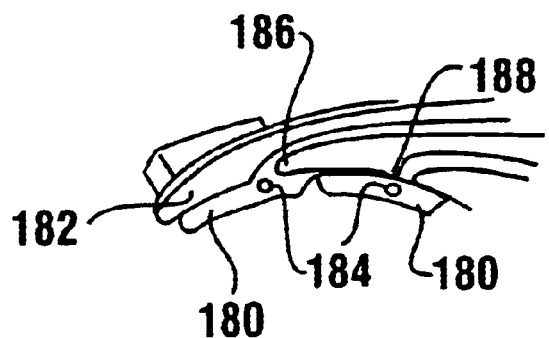
FIG. 31 shows a partial view of adjacent upstream fingers and downstream finger element portions depicting supply holes for hydrostatic lift pads.

FIG. 31 shows an angled view toward downstream of adjacent upstream and downstream finger elements 182, 180 respectively. Orifice entry or supply holes or openings 184 can be situated between adjacent upstream finger elements 182. An orifice path can extend from the supply hole and through a lift pad, such as a lift pad previously discussed with regard to any of FIGS. 25–30. As an assurance that upstream finger movement would not totally block an orifice supply hole, the center of a supply hole can be located at the inner diameter of the upstream finger element(s). Adjacent upstream fingers may also have a portion thereof cut away at the inner diameter finger pad toe 186 or heel 188 to preclude supply hole blockage.

FIGS. 32–39 show arrangements to reduce or eliminate a lift pad bending or twisting relative to the remainder of the finger element (e.g., the finger). A lift pad may have an attachment joint with a finger. For example, as previously discussed, a lift pad may be brazed to a finger. Thus, an exemplary form of the invention can prevent a lift pad from bending at its attachment joint with a finger.

Figure 32:
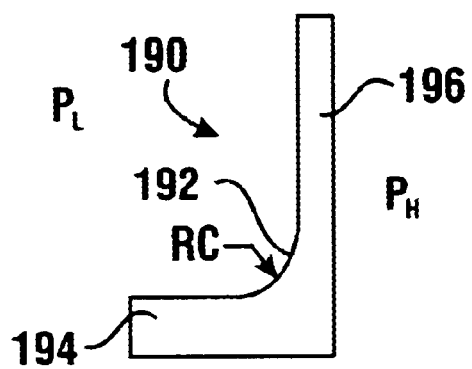
FIG. 32 shows a finger element portion having a fillet between the finger and the lift pad.

FIG. 32 shows a finger element portion 190 having a fillet 192 (e.g., a fill, joiner, band, binder, or strip, such as a concave strip) located between the outside diameter of a lift pad 194 and the finger 196. The fillet strengthens the juncture at the lift pad and finger. A fillet can create a radial attachment juncture, including forming a radial curvature $R_c$ (e.g., radius) intermediate or between a lift pad and a finger.

Figure 33:
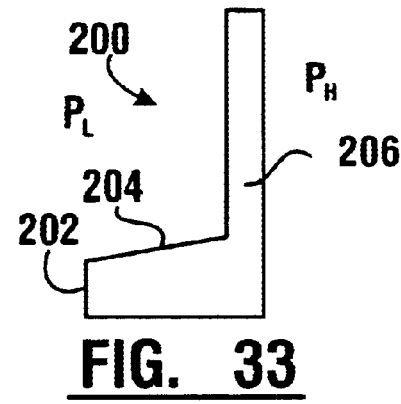
FIG. 33 shows a finger element portion having a lift pad having a tapered outer diameter.
Figure 34:
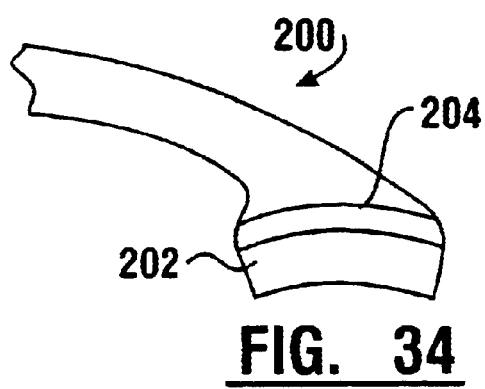
FIG. 34 shows a downstream side view of the finger element portion of FIG. 33.

FIG. 33 shows a finger element portion 200 having a stiffened lift pad 202. The lift pad has a tapered outer diameter 204. The outer diameter 204 can narrow (e.g., become thinner or smaller) as it slopes away from the finger 206 (e.g., narrow along an axial direction of a rotor). The taper may further narrow in a circumferential direction. For example, the lift pad may have a sloping triangular or wedge shape. A downstream side view of the finger element portion with the lift pad 202 is shown in FIG. 34.

Figure 35:
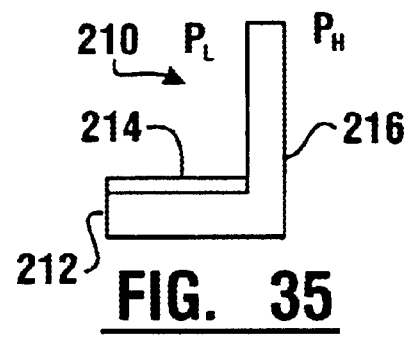
FIG. 35 shows a finger element portion having a lift pad with a substantially straight rib thereon.
Figure 36:
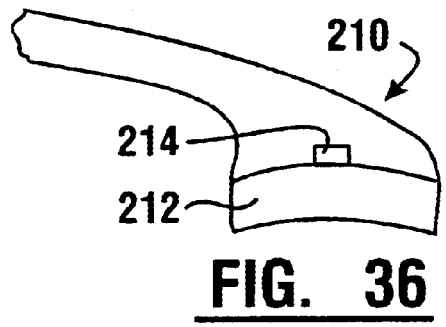
FIG. 36 shows a downstream side view of the finger element portion of FIG. 35.

FIG. 35 shows a finger element portion 210 having a stiffened lift pad 212 including a rib 214 (e.g., a supporting, strengthening, or stiffening member) on its outer diameter. As shown, the rib 214 may be substantially straight, horizontally level, and/or non-tapered. The rib can run or extend away from the finger 216 (e.g., extend in the axial direction of a rotor). A cut away downstream side view of the finger element portion with the lift pad 212 facing toward the finger 216 is shown in FIG. 36. The rib can be positioned in a variety of locations on the lift pad. In an exemplary form of the invention a rib is positioned near the mid-section or center of the lift pad, as shown in FIG. 36.

Figure 37:
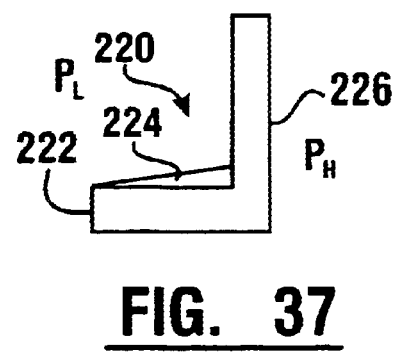
FIG. 37 shows a finger element portion having a lift pad with a tapered rib thereon.
Figure 38:
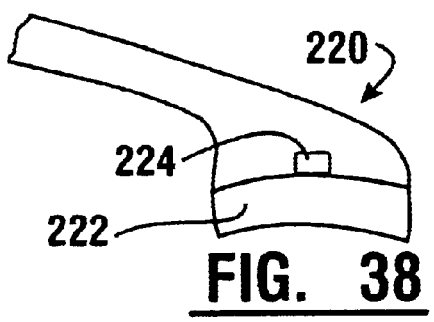
FIG. 38 shows a downstream side view of the finger element portion of FIG. 37.

FIG. 37 shows a finger element portion 220 having a lift pad 222 including a tapered rib 224 on its outer diameter. The rib can run or extend in a direction along the axis of a rotor. The rib taper can narrow as it slopes away (e.g., in an axial direction) from the finger 226. The rib taper may further narrow in a circumferential direction. For example, the rib may be triangular or wedge-shaped. A cut away downstream side view of the finger element portion with the lift pad 222 facing toward the finger 226 is shown in FIG. 38. The rib can be positioned in a variety of locations on the lift pad. In an exemplary form of the invention the rib is positioned near the mid-section or center of the lift pad, as shown in FIG. 38.

Figure 39:
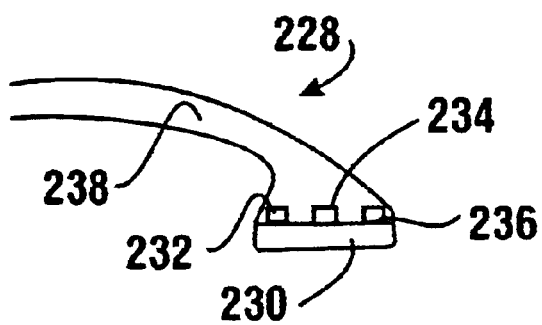
FIG. 39 shows a downstream side view of a finger element portion having a lift pad with multiple ribs.

FIG. 39 shows a finger element portion 228 having a cut away side view of a lift pad 230 having multiple ribs 232, 234, 236. The ribs can run or extend away from a finger 238 of the finger element portion. A rib may comprise the same material as a lift pad or a rib may comprise a different material. A rib may also be integral or one-piece with a lift pad. Ribs may be of various sizes and configurations. For example, the ribs 232, 234, 236 may comprise a combination of the previously discussed ribs of FIGS. 35–38. Plural ribs may be arranged in a variety of configurations on the lift pad. For example, the ribs 232, 234, 236 may be equally spaced and/or balanced, as shown. Although three ribs are shown, it should be understood that a greater or fewer number of plural ribs may be used in association with a lift pad. Other lift pad arrangements can also be used. For example, a lift pad may have a tapered outer diameter with one or more straight or tapered ribs. A lift pad with a tapered outer diameter may also have one or more tapered ribs going against the outer diameter taper to create a generally straight (level) outer surface.

It should also be understood the pressure forces can load the upstream fingers axially against the downstream fingers. Furthermore, radial lift of the downstream fingers and their respective lift pads due to hydrostatic or hydrodynamic forces can also cause the radial lift of the upstream fingers.

A number of fabrication techniques may be used to generate lift pad geometries, such as chemical etching, machining, and/or a masking and plating process. Similarly, these fabrication processes can be used to create hydrodynamic lift features on a rotor outer diameter. A finger seal apparatus of the present invention can be fabricated from materials suitable for the intended sealing application. For example, in a high temperature application cobalt or nickel based metal alloys (e.g., Haynes-25, Inconel X-750, or Waspalloy) or ceramics (e.g., silicon nitride, silicon carbide, or aluminum oxide) may be used. In more moderate temperatures, stainless steels may be used. For cooler temperatures, engineered plastics can be used, which may lower costs. If necessary, hardened and/or low friction coatings may also be used. For example, a chrome carbide coating or chrome carbide coating with solid film lubricants or a tungsten carbide coating may be used on the outer diameter of a rotatable member (e.g., a rotor). Additionally, if applications require, hardened coatings may be used on a surface of the seal (e.g., on the lift pad inner diameter).

Thus the new and improved finger seal apparatus features achieve at least one of the above stated objectives, eliminate difficulties encountered in the use of prior devices and systems, solve problems, and attain the desirable results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the details shown and described. It is to be understood that various modifications and enhancements may be made without departing from the spirit and scope of the invention.

Further, in the following claims any feature that is described as a means for performing a function shall be construed as encompassing any means capable of performing that function and shall not be limited to the particular means shown in the foregoing description or mere equivalents.

Having described the features, discoveries, and principles of the invention, the manner in which it is constructed and operated, and the useful results attained; the new and useful structures, devices, elements, arrangements, parts, combinations, systems, equipment, operations, methods, and relationships are set forth in the appended claims.

We claim:

1. An apparatus including:
a finger seal adapted to be interposed between an upstream region of relatively high fluid pressure and a downstream region of relatively lower fluid pressure, the finger seal comprising:
circumferentially extending first and second finger elements,
wherein the first and second finger elements each include a plurality of spaced integral fingers,
wherein the fingers define gaps therebetween,
wherein the first and second finger elements are adjacently positioned so that the fingers of each block the gaps of the other,
a lift pads,
wherein each lift pad extends from a respective finger,
wherein each lift pad is adapted to be arranged adjacent a rotating member, whereby at least a portion of each lift pad is operative to lift away from the rotating member upon at least one of sufficient rotational speed of the rotating member or hydrostatic pressure loading adjacent the lift pad,
wherein when the first finger element is positioned downstream of the second finger element, all lift pads of the finger seal extend from their respective finger in a downstream direction.

2. The apparatus according to claim 1
wherein the first finger element is an annular finger element,
wherein the first finger element has an innermost diameter,
wherein the second finger element is an annular finger element,
wherein each second finger element finger has an innermost diameter,
wherein each second finger element finger innermost diameter is larger than the first finger element innermost diameter.

3. The apparatus according to claim 2 wherein the first finger element includes lift pads, wherein each lift pad of the first finger element has an innermost diameter, wherein each second finger element finger innermost diameter is larger than each lift pad innermost diameter of the first finger element.

4. The apparatus according to claim 3 wherein each lift pad of the first finger element has an outermost diameter, wherein each second finger element finger innermost diameter is smaller than each lift pad outermost diameter of the first finger element.

5. The apparatus according to claim 2 and further comprising a forward cover plate, an aft cover plate, a forward spacer, an aft spacer, a seal dam, and a pressure balance cavity.

6. The apparatus according to claim 1 wherein the fingers of only the first finger element each include a lift pad extending therefrom.

7. The apparatus according to claim 1 wherein each lift pad has a greater axial dimension than its respective finger.

8. The apparatus according to claim 1 wherein each lift pad extends in a direction away from the other one of the first and second finger elements.

9. The apparatus according to claim 1 and further comprising an upstream region of relatively high fluid pressure and a downstream region of relatively lower fluid pressure,
wherein the first finger element is positioned downstream of the second finger element,
wherein all lift pads extend in a downstream direction.

10. The apparatus according to claim 9 and further comprising a rotatable member,
wherein each lift pad is arranged adjacent the rotatable member, whereby at least a portion of each lift pad is operative to lift away from the rotatable member upon at least one of sufficient rotational speed of the rotatable member or hydrostatic pressure loading adjacent the lift pad.

11. The apparatus according to claim 10 wherein the second finger element is spaced from the rotatable member. wherein the groove pattern comprises one of a herringbone groove pattern, a double herringbone groove pattern, a buckets groove pattern, or a combination of grooves having varying widths and lengths.

12. The apparatus according to claim 11 wherein the finger seal provides sealing to the rotatable member, and wherein the second finger element remains spaced from the rotatable member during the sealing.

13. The apparatus according to claim 10
wherein the rotatable member comprises a rotor, wherein the rotor comprises a groove pattern thereon, wherein the groove pattern is operative to generate hydrodynamic lift during rotation of the rotor,
wherein the groove pattern comprises one of a herringbone groove pattern, a double herringbone groove pattern, a buckets groove pattern, or a combination of grooves having varying widths and lengths.

14. The apparatus according to claim 1 wherein the at least a portion of each lift pad is operative to lift away from the rotating member as a result of at least hydrostatic pressure loading adjacent the lift pad.

15. An apparatus including:
a finger seal adapted to be interposed between an upstream region of relatively high fluid pressure and a downstream region of relatively lower fluid pressure, the finger seal comprising:
a circumferentially extending downstream finger element,
wherein the downstream finger element includes a plurality of spaced integral downstream fingers,
wherein the downstream fingers define gaps therebetween,
wherein each downstream finger includes a lift pad extending in a downstream direction,
wherein each lift pad is adapted to be arranged adjacent a rotating member, whereby at least a portion of each lift pad is operative to lift away from the rotating member upon at least one of sufficient rotational speed of the rotating member or hydrostatic pressure loading adjacent the lift pad,
a circumferentially extending upstream finger element, wherein the upstream finger element includes a plurality of spaced integral upstream fingers,
wherein the upstream fingers define gaps therebetween,
wherein the upstream finger element has an innermost diameter larger than an innermost diameter of the downstream finger element,
wherein the upstream and downstream finger elements are adjacently positioned so that the fingers of each block the gaps of the other.

16. The apparatus according to claim 15 wherein each lift pad has an innermost diameter, wherein the innermost diameter of the upstream finger element is larger than the innermost diameter of each lift pad.

17. The apparatus according to claim 16 wherein each lift pad has an outermost diameter, wherein the innermost diameter of the upstream finger element is smaller than the outermost diameter of each lift pad.

18. The apparatus according to claim 15 wherein the fingers of only the downstream finger element each include a lift pad.

19. The apparatus according to claim 15 and further comprising an upstream region of relatively high fluid pressure, a downstream region of relatively lower fluid pressure, and a rotatable member,
wherein the downstream finger element is positioned downstream of the upstream finger element,
wherein each lift pad extends in a downstream direction,
wherein each lift pad is arranged adjacent the rotatable member, whereby at least a portion of each lift pad is operative to lift away from the rotatable member upon at least one of sufficient rotational speed of the rotatable member or hydrostatic pressure loading adjacent the lift pad,
wherein the upstream finger element is spaced from the rotatable member.

20. The apparatus according to claim 15 and further comprising a forward cover plate, an aft cover plate, a forward spacer, an aft spacer, a seal dam, and a pressure balance cavity.

21. The apparatus according to claim 15 wherein the lift pads comprise at least one lift pad from a group comprising: lift pads including a circumferential groove, converging flow axial tapered lift pads, converging flow circumferentially tapered lift pads, combination of axially and circumferentially tapered lift pads, axial Rayleigh-step lift pads, circumferential Rayleigh-step lift pads, circumferential step lift pads, orifice-compensated lift pads, orifice-compensated hydrostatic lift pads, orifice-compensated hydrostatic lift pads including a pocket, tapered outer diameter lift pads, rib stiffened lift pads, tapered rib lift pads, multi ribbed lift pads, and lift pads including a fillet adjacent a lift pad outside diameter.

22. An apparatus including:
a finger seal adapted to be interposed between an upstream region of relatively high fluid pressure and a downstream region of relatively lower fluid pressure, the finger seal comprising:
circumferentially extending first and second finger elements,
wherein the first and second finger elements each include a plurality of spaced integral fingers, wherein the fingers define gaps therebetween, wherein the first and second finger elements are adjacently positioned so that the fingers of each block the gaps of the other,
a lift pad extending from each finger of at least the first finger element,
wherein each first finger element lift pad has an innermost diameter,
wherein each first finger element lift pad has an outermost diameter,
wherein each second finger element finger has an innermost diameter,
wherein each second finger element finger innermost diameter is larger than each first finger element lift pad innermost diameter,
wherein each second finger element finger innermost diameter is smaller than each first finger element lift pad outermost diameter,
wherein each lift pad is adapted to be arranged adjacent a rotating member, whereby at least a portion of each lift pad is operative to lift away from the rotating member upon at least one of sufficient rotational speed of the rotating member or hydrostatic pressure loading adjacent the lift pad.

23. The apparatus according to claim 22 wherein when the first finger element is positioned downstream of the second finger element, each lift pad extends in a downstream direction.

24. An apparatus including:
a finger seal adapted to be interposed between an upstream region of relatively high fluid pressure and a downstream region of relatively lower fluid pressure, the finger seal comprising:
circumferentially extending first and second finger elements,
wherein the first and second finger elements each include a plurality of spaced integral fingers, wherein the fingers define gaps therebetween,
wherein the first and second finger elements are adjacently positioned so that the fingers of each block the gaps of the other,
wherein the fingers of only the first finger element each include a lift pad extending therefrom,
wherein each lift pad is adapted to be arranged adjacent a rotating member, whereby at least a portion of each lift pad is operative to lift away from the rotating member upon at least one of sufficient rotational speed of the rotating member or hydrostatic pressure loading adjacent the lift pad.

25. The apparatus according to claim 24 wherein when the first finger element is positioned downstream of the second finger element, each lift pad extends in a downstream direction.

26. An apparatus including:
a finger seal adapted to be interposed between an upstream region of relatively high fluid pressure and a downstream region of relatively lower fluid pressure, wherein the finger seal comprising:
a circumferentially extending downstream finger element,
wherein the downstream finger element includes a plurality of spaced integral downstream fingers,
wherein the downstream fingers define gaps therebetween,
wherein each downstream finger includes a lift pad extending therefrom,
wherein each lift pad extends in a downstream direction,
wherein each lift pad has an innermost diameter,
wherein each lift pad has an outermost diameter,
wherein each lift pad is adapted to be arranged adjacent a rotating member, whereby at least a portion of each lift pad is operative to lift away from the rotating member upon at least one of sufficient rotational speed of the rotating member or hydrostatic pressure loading adjacent the lift pad,
a circumferentially extending upstream finger element,
wherein the upstream finger element includes a plurality of spaced integral upstream fingers,
wherein the upstream fingers define gaps therebetween,
wherein the upstream and downstream finger elements are adjacently positioned so that the fingers of each block the gaps of the other,
wherein each upstream finger is devoid of a lift pad,
wherein each upstream finger has an innermost diameter,
wherein each upstream finger innermost diameter is larger than each lift pad innermost diameter,
wherein each upstream finger innermost diameter is smaller than each lift pad outermost diameter,
an upstream cover plate, a downstream cover plate, an upstream spacer, a downstream spacer, a seal dam, and a pressure balance cavity,
wherein the pressure balance cavity is at least partly created by the downstream spacer, the downstream cover plate, and the seal dam.

* * * * *

UNITED STATES PATENT AND TRADEMARK OFFICE
CERTIFICATE OF CORRECTION

PATENT NO. : 6,811,154 B2
DATED : November 2, 2004
INVENTOR(S) : Proctor et al.

It is certified that error appears in the above-identified patent and that said Letters Patent is hereby corrected as shown below:

<u>Column 12,</u>
Line 37, "a lift pads" should read -- lift pads --.

<u>Column 13,</u>
Line 34-37, the text should be canceled.

<u>Column 16,</u>
Line 5, "comprising" should read -- comprises --.

Signed and Sealed this

Fifteenth Day of February, 2005

JON W. DUDAS
*Director of the United States Patent and Trademark Office*